United States Patent [19]

Torossian et al.

[11] 4,046,938

[45] Sept. 6, 1977

[54] INSULATING MATERIAL

[75] Inventors: Kevork A. Torossian; Leo S. Kohn, both of Schenectady, N.Y.

[73] Assignee: General Electric Company, Schenectady, N.Y.

[21] Appl. No.: 708,256

[22] Filed: July 23, 1976

Related U.S. Application Data

[63] Continuation of Ser. No. 277,482, Aug. 2, 1972, abandoned.

[51] Int. Cl.² .................. B32B 17/10; B32B 27/36; H01B 7/28; B32B 27/38
[52] U.S. Cl. .................. 428/285; 174/120 SR; 428/324; 428/363; 428/411; 428/412; 428/413; 428/415; 428/417; 428/420; 428/430; 428/431; 428/454; 428/474; 428/480
[58] Field of Search ............. 428/285, 412, 411, 415, 428/413, 420, 480, 417, 474, 454, 363, 324, 431, 430; 174/121 SR, 122 R, 122 G, 121 R, 120 SR; 336/206

[56] References Cited

U.S. PATENT DOCUMENTS

| | | | |
|---|---|---|---|
| 3,258,356 | 6/1966 | Caldwell | 428/412 |
| 3,380,878 | 4/1968 | Wheeler | 428/417 |
| 3,427,189 | 2/1969 | Brechna | 428/242 |
| 3,531,369 | 9/1970 | Bauman | 428/415 |
| 3,560,320 | 2/1971 | Letteron | 428/363 |
| 3,616,140 | 10/1971 | Copeland | 428/412 |
| 3,660,220 | 5/1972 | Groff | 428/237 |
| 3,769,446 | 10/1973 | Martincic | 174/143 |
| 3,769,447 | 10/1973 | Quirk | 174/143 |

*Primary Examiner*—Ellis Robinson

[57] ABSTRACT

Composite electrical insulating material is protected by at least one outer polymeric layer which dissolves in the bonding or impregnating resin at elevated temperatures, permitting ready handling of the relatively fragile insulating material, and by reason of dissolution when installed, permitting the ready further impregnation of the assembled insulation.

7 Claims, No Drawings

INSULATING MATERIAL

This is a continuation of application Ser. No. 277,482 filed Aug. 2, 1972, now abandoned.

This invention relates to composite insulating material. More particularly, it relates to new and improved insulating materials in sheet or tape form which are particularly characterized by one or more outer protective layers of polymer material which, upon heating, dissolve in the impregnating or binder material, thus permitting the ready further impregnation of the insulating material with further resinous material, such dissolution of the protective layers and curing of the impregnant providing a solid final insulating layer.

Insulating sheets and tapes made of reinforced mica paper, mica flakes, asbestos and other inorganic platy and fibrous material as well as synthetic materials including polyamides, polyesters, glass and the like are well known. Generally speaking, such materials require reinforcement particularly when in felted or matted form or when in the form of overlapping platelets or flakes, and such reinforcement is often provided by underlying layers or interlayers of glass fabric or high temperature polymeric fabric or combinations of such materials. While such reinforced insulating material has found widespread use in the electrical insulating art, the protective qualities afforded to the relatively fragile insulating material by the fabric backer leave something to be desired, and additionally are quite expensive if enough protective layers are used to provide adequate support and protection. Such additional protective layers also add to the thickness of the final insulating material without contributing commensurate electrical insulation.

From the above it will be quite apparent that there is a need for insulating materials of relatively delicate or fragile physical constitution which can be readily applied in regular practice and which once assembled or installed present a maximum of electrical insulation quality unhampered by excessive protective layers which add little or nothing to such insulating effectiveness.

It is therefore a principal object of this invention to provide electrical insulating sheet or tape material having a relatively fragile insulating layer with or without a supporting backer material, the whole having on at least one side a protective layer of relatively high temperature resistant polymeric or resinous material which will dissolve in the insulation binder or impregnant at curing temperatures or at above room temperature.

Those features of the invention which are believed to be novel are set forth with particularity in the claims appended hereto. The invention will, however, be better understood and further advantages and objects thereof appreciated from a consideration of the following description.

The electrical insulating element of the present invention can be any of a number of well known materials including but not limited to reconstituted mica or mica paper, mica flakes, glass flakes, asbestos fibers and any other well known generally siliceous inorganic electrical insulating materials. Also useful as the electrical insulating element of the material are various well known synthetic materials in fabric film or matte form, including but not limited to various polyesters and polyamides which can be used alone or in conjunction with the above materials.

If a supporting backer is used, it can consist of glass fabric or a combination of glass and synthetic fibers such as, for example, polyethylene terephthalate or any other material which is relatively porous and has supportive qualities for the more fragile insulating element. In certain cases where indicated, the supporting or backing layer can be omitted.

Any of a number of well known thermosetting resins can be used as the impregnating or binder material, the only requirement being that it shall be capable, when heated, of dissolving the outer protective resin layers. Such resins include epoxies, polyesters, alkyd resins, and polyimides, among others. While epoxy resins are used in the illustrated embodiments of the present invention, it is to be understood that the invention is in no way limited to such materials.

The epoxy resin employed as the thermosetting resin in this invention can be any epoxy resin having 1,2 epoxy groups or mixtures of such resins as indicated, and includes cycloaliphatic epoxy resins, such as 3,4-epoxycyclohexylmethyl-(3,4-epoxy)cyclohexane carboxylate (sold under the trademark ERL 4221 by Union Carbide Plastics Company, or Araldite CY 179 by Ciba Products Company), bis(3,4-epoxy-6-methylcyclohexylmethyl) adipate (sold under the trademark ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl)ether resins (sold under the trademark ERL 4205 by Union Carbide Plastics Company), 2-(3,4-epoxy)cyclohexyl-5,5-spiro(3,4-epoxy)-cyclohexane-m-dioxane (sold under the trademark Araldite CY 175 by Ciba Products Company), glycidyl ethers of polyphenols, epoxy resins, such as liquid or solid bisphenol-A diglycidyl ether epoxy resins (such as those sold under trademarks as Epon 826, Epon 828, Epon 830, Epon 1001, Epon 1002, Epon 1004,, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company), tetraglycidoxy tetraphenylethane (Epon 1031 made by Shell Chemical Company), glycidyl ester epoxy resins such as diglycidyl phthalate (ED-5661 by Celanese Resins Company), diglycidyl tetrahydrophthalate (Araldite CY 182 by Ciba Products Company) and diglycidyl hexahydrophthalate (Araldite CY 183 made by Ciba Products Company or Ed-5662 made by Celanese Resins Company), and flame retardant epoxy resins such as halogen containing bisphenol-A diglycidyl ether epoxy resins (e.g., DER 542 and DER 511 which have bromine contents of 44–48 and 18–20 percent, respectively, and are made by Dow Chemical Company).

The foregoing epoxy resins are well known in the art and are set forth, for example, in many patents including U.S. Pat. Nos. 2,324,483; 2,444,333; 2,494,295; 2,500,600; and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and nonreactive epoxy diluents (or extenders), epoxy flexibilizers and fillers.

Any of the usual hardeners for epoxy resins can be used which will cure at above room temperature including the various anhydrides, BF$_3$ complexes and the like which are well known to those skilled in the art.

The hardener for the epoxy resin can also be a long shelf life mixture of an organic titanate which can contain a phenolic accelerator wherein the phenolic accelerator is present in quantities less than 15 percent by weight of the epoxy resin. Among the phenolic accelerators which can be effectively used in this invention are bisphenol-A [i.e., 2,2-bis(4-hydroxyphenyl)propane], pyrogallol, dihydroxydiphenyls as well as ortho-, meta-, and para- hydroxybenzaldehydes (such as salicylaldehyde), catechol, resorcinol, hydroquinone, and phenolformaldehyde and resorcinolformaldehyde condensates. Other phenolic accelerators suitably employed for the resin impregnant include halogenated phenols such as ortho-, meta-, and para-chlorophenols or bromo-phenols, and ortho-, meta-, and para- nitrophenols. Desirably, when used, the phenolic accelerator is present in concentrations between 0.1 and 15 percent by weight of the epoxy resin with optimum cure rates being produced with phenolic accelerator concentrations between 0.5 and 10 percent by weight of the epoxy resin. In general, the cure rate of the epoxy resin can be altered by varying the weight percentage of phenolic accelerator employed with the epoxy resin or by an alterations in the phenolic accelerator-epoxy resin combination. For example, the cure rate of ERL 4221-titanate-bisphenol-A solutions can be significantly increased by substituting a phenol-formaldehyde novolac accelerator for the bisphenol-A accelerator. Similarly, by substituting the phenol-formaldehyde novolac in the ERL-4221-titanate-novolac solution with catechol, the rate of cure can again be markedly increased. Within each epoxy-titanate-phenolic combination, the cure rate generally can be increased by increasing the relative phenolic content. By substituting the cycloaliphatic epoxy resin ERL-4221 with a diglycidyl ether epoxy resin such as Epon 828, the cure rate is decreased. Although the cure rate can be varied over a very wide range, the cured resins are tough solids with excellent electrical insulating properties.

The organic titanate added to the epoxy resin to assist the phenolic accelerator in controllably hardening the epoxy resin preferably is a chelated titanate such as acetylacetonate titanate, lactate titanate, triethanolamine titanate, polyhydroxystearate titanate, a glycolate titanate (e.g., tetraoctylene glycol titanate containing approximately 7.8 percent Ti and sold under the trademark Tyzor OG by E. I. duPont de Nemours and Company, or di-n-butyl hexylene glycol titanate), or a chelate stabilized with a nitrogen containing polymer (e.g., Tyzor WR sold by E. I. duPont de Nemours & Company). By use of chelated titanates, the thermosetting resin can be employed in areas having a substantial water content in the ambient atmosphere. When the thermosetting resin is applied in an atmosphere having substantially zero humidity, non-chelated titanates such as tetraisopropyl titanate, tetrabutyl titanate, polymerized tetrabutyl titanate and tetrakis (2-ethylhexyl) titanate also can be employed for the epoxy resin hardener. Chelated titanates, such as acetylacetonate titanate, tetraoctylene glycol titanate and di-n-butyl hexylene glycol titanate, however, are preferred for the epoxy resin hardener to provide a homogeneous mixture while exhibiting resistance to hydrolyzation under humid conditions. In general, the chosen titanate should be present in the mixture in a concentration between 0.05 and 10 percent by weight of the epoxy resin with optimum cure rates generally being obtained utilizing titanate concentrations between 0.2 and 5 percent by weight of the epoxy resin.

The resin, phenolic accelerator and titanate chosen for the thermosetting resin can be mixed in any conventional fashion. A liquid phenolic can be dissolved in the epoxy resin or in the titanate either at room temperature or at elevated temperatures. A solid phenolic accelerator in powdered form also can be dissolved in the epoxy resin at room temperature by continuous agitation prior to mixing with the chosen titanate or a liquid concentrate can be formed by dissolving the powered phenol in part of the epoxy resin at temperatures between 150° and 160° C whereafter the liquid solution is mixed with the remainder of the epoxy resin. Alternately, the solid phenolic accelerator can be dissolved in the titanate at temperatures of 100°-160° C whereupon the phenolic accelerator/titanate mixture is added to the epoxy resin to effect hardening. The shelf life of epoxy resin compositions utilizing phenolic cure accelerators can be substantially increased by blocking all or some of the hydroxyl groups on the accelerator.

The protective outer resin or polymer layer of the invention can consist of any of a number of materials either alone or in admixture, the only requirement being that they shall be capable of protecting the relatively delicate insulating material during assembly or installation as in wrapping about conductor bars and the like, that they not be soluble in the impregnating or binding resin until exposed to relatively high binder curing temperatures or temperatures approaching such curing temperature and that they be resistant or insoluble up to such temperatures. The present invention is particularly applicable to those insulating procedures in which the insulating material is applied and then at elevated temperatures impregnated with further resin, the present protective layers having by the time of the further impregnation provided for having fulfilled their protective and supportive role and dissolved to permit ready further impregnation of the insulating material. Among the materials which have been found to be particularly useful in this respect, and especially so in conjunction with epoxy resins, are the polysulfones, polycarbonates and polyphenylene oxides. These materials are especially useful in that, unlike some materials such as polyethylene, they when once dissolved remain in solution even when the insulation is later cooled. Polyethylene terephthalate is not generally soluble in such impregnants and tends to peel off.

The electrical insulation of the invention is readily assembled in any of a number of well known manners. Generally speaking, the insulating elements are impregnated with the resinous binder or impregnant, laid up on any protective backer or supportive layer, and after the desired number of insulating elements and supporting layers have been achieved, overlaying on at least one face the above protective layer. The resinous material serves to bond the layers of the insulation together, provides a relatively slippery surface for ready winding on conductor bars or other structures to be insulated, and when heated disappears or dissolves in the binder, thus providing a final insulating structure consisting essentially of material which is especially adapted for electrical insulation in the final structure of space taking ancillary matter. As pointed out above, the structure before final curing and after dissolution of the supporting layers can be impregnated with further resin. This in itself is a prime advantage of the present invention in that the insulating material as applied need not be loaded with its full complement of impregnating resin, making for a more readily applied material.

The following examples will illustrate the practice of the invention, it being realized that such examples are to be taken as exemplary only and not limiting in any way.

EXAMPLE 1

A sheet of mica paper 4 mils in thickness was impregnated with a resin consisting of, by weight, 100 parts of ERL 4221, 2 parts Tyzor OG and 3 parts of a mixture of 2 parts of ERL 4221 and bisphenol-A. A layer of 1.7 mil glass fabric was laid up on the mica paper and the whole fastened on either side with a 0.25 mil sheet of polycarbonate resin film. ¼ × 1 inch rectangular steel bars simulating conductors or conductor bars were half-lapped with 4 layers of this tape to a thickness of 9 mils, the tape containing 36 percent by weight of the resin. The insulation was overlaid with one butt-lapped layer of 4 mil glass fabric impregnated with the same resin as an armor layer, the whole being cured in a press at 160° C and 100 psi for 2 hours and then left at atmospheric pressure for about 12 hours at 160° C. The dissipation factor at 10 volts per mil of the finished insulation was 0.005 at 25° C, 0.014 at 100° C, 0.031 at 150° C, and 0.035 at 170° C. The final insulation was solid throughout with no separable layers, the polycarbonate layers having dissolved.

EXAMPLE 2

Example 1 was repeated using as the impregnating and bonding resin 50 parts of Empol 1014, 45 parts ERL 4221, and 1 part of stannous octoate, the steel bars being overlaid with 7½ layers of tape with the armor layer of Example 1. Empol 1014 made by Emery Industries is a dimer and having about 36 carbon atoms and two carboxyl groups per molecule and a molecular weight of about 565. The dissipation factor at 10 volts per mil of the insulation, cured as in Example 1, of one bar was 0.31 at 25° C, 0.034 at 100° C, 0.074 at 125° C, 0.223 at 150° C, and 0.386 at 175° C. Another bar so insulated had a dissipation factor at 25° C of 0.025, the same at 100° C, and dissipation factors of 0.052 at 125° C, 0.114 at 150° C and 0.366 at 175° C. Once again, the final insulation was solid and unitary in nature.

EXAMPLE 3

Example 1 was repeated using no glass fabric supporting layer and utilizing a binder resin consisting of 1 part of zirconium acetylacetonate and 100 parts ERL 4221. Steel bars as in Example 1 wrapped with 6½ layers of the above insulation having a resin content of about 35 percent had dissipation factors at 10 volts per mil of 0.031 and 0.031 at 25° C, 0.021 and 0.014 at 100° C, and 0.206 and 0.250 at 175° C. A unitary insulating wall resulted, the supporting layers having dissolved.

EXAMPLE 4

Example 3 was repeated except that the steel bar was wrapped with 4½ layers of the insulating material, giving a dissipation factor at 10 volts per mil of 0.009 at 25° C, 0.025 at 100° C, and 0.057 at 175° C. Again a unitary insulation resulted with the supporting layers having disappeared as such.

EXAMPLE 5

Example 1 was repeated except that the binder material consisted of 50 parts Epon 828, 50 parts DEN 438, 5 parts Tyzor OG, and 5 parts resorcinaol. When the steel bars of Example 1 were wrapped with 6½ layers of this material, the dissipation factor of the resulting unitary insulation at 10 volts per mil was 0.011 at 27° C and 0.054 at 150° C.

EXAMPLE 6

Example 1 was repeated except that the resinous impregnants used consisted of 2100 parts DEN 438, 900 parts Epon 828, 150 parts Tyzor OG and 150 parts resorcinol, the laid-up insulation being impregnated at 85° C and heat-soaked overnight at 85° C, the resin content being 38 percent. When the steel bars of Example 1 were wrapped with 5½ layers of this insulation, the 10 volt per mil dissipation factor was 0.006 at 27° C and 0.065 at 175° C. When 6½ wraps of the insulation were used, the dissipation factor was 0.005 at 27° C and 0.0056 at 175° C. When 16 layers of this insulation were used on two bars, the 10 volt per mil dissipation factors were 0.003 and 0.004 at 27° C, 0.009 and 0.009 at 100° C, 0.014 and 0.013 at 130° C, 0.022 and 0.019 at 155° C, and 0.045 and 0.034 at 175° C. In all cases the insulation was solid, the supporting layers having dissolved.

EXAMPLE 7

Example 5 was repeated except that in lieu of the polycarbonate layers, 0.2 mil thick layers of polysulfone were used. When the insulation so prepared according to the process of Example 5 was laid up on the steel bars of Example 1 with 8½ layers or a thickness of about 300 mils, the 10 volt per mil dissipation factor was 0.004 and 0.005 at 27° C, 0.011 and 0.010 at 100° C, 0.014 and 0.014 at 130° C, 0.019 and 0.019 at 155° C, and 0.021 and 0.022 at 175° C. The polysulfone layers had dissolved leaving a solid unitary wall of insulation.

There is provided, then, by the present invention electrical insulation usually in sheet or tape form which, by reason of the protective layer on at least one outer surface, is readily applied to the member to be insulated without fear of destroying the electrical or physical integrity of the tape. Furthermore, by reason of such protective layer, less than usual amounts of binder or impregnating resin can be used. Then with the insulation assembled in place, the insulation can be further treated at elevated temperatures with more impregnating material, the protective layers dissolving and allowing the ready passage through the entire insulation of the resinous material. When cured, the insulation presents a unitary monolithic block or layer of insulating material which is characterized by good physical and electrical qualities. The present materials can be used for any of a number of purposes which will be apparent to those skilled in the art. They are particularly useful for insulating electrical members such as conductors, conductor bars, and the like.

What we claim as new and desire to secure by Letters Patent of the United States is:

1. Composite electrical insulation comprising at least one layer of electrical insulating tape, said tape consisting essentially of (a) at least one electrical insulating layer, (b) thermosetting resin impregnant for (a) and adhering to at least one outer surface of (a) a protective polymer film which is soluble in said resin at the curing temperature of said resin, said polymer film being selected from the group consisting of polycarbonate, polysulfone and polyphenylene oxide.

2. Electrical insulation as in claim 1 wherein said insulating layer comprises micaceous material.

3. Electrical insulation as in claim 2 wherein said insulation comprises additionally at least one glass fabric layer.

4. Electrical insulation as in claim 1 wherein said resin impregnant comprises epoxy resin.

5. The cured insulation of claim 1.

6. A structure insulated with the cured insulation of claim 5.

7. Electrical insulation as in claim 1 wherein said insulation contains additionally at least one supporting layer.

* * * * *